United States Patent
Haringstad

(10) Patent No.: US 9,726,313 B2
(45) Date of Patent: Aug. 8, 2017

(54) COMPACT PIPE FLANGE GASKET

(71) Applicant: Morgan Haringstad, Kopervik (NO)

(72) Inventor: Morgan Haringstad, Kopervik (NO)

(*) Notice: Subject to any disclaimer, the term of this patent is extended or adjusted under 35 U.S.C. 154(b) by 6 days.

(21) Appl. No.: 15/105,174

(22) PCT Filed: Dec. 11, 2014

(86) PCT No.: PCT/NO2014/050231
§ 371 (c)(1),
(2) Date: Jun. 16, 2016

(87) PCT Pub. No.: WO2015/093968
PCT Pub. Date: Jun. 25, 2015

(65) Prior Publication Data
US 2016/0312934 A1   Oct. 27, 2016

(30) Foreign Application Priority Data

Dec. 18, 2013  (NO) .................................. 20131699

(51) Int. Cl.
*G01M 3/28* (2006.01)
*F16L 23/16* (2006.01)
*F16L 23/032* (2006.01)
*F16L 23/22* (2006.01)

(52) U.S. Cl.
CPC ........... *F16L 23/167* (2013.01); *F16L 23/032* (2013.01); *F16L 23/22* (2013.01); *G01M 3/2853* (2013.01)

(58) Field of Classification Search
CPC ......... F16L 23/00; F16L 23/16; F16L 23/167; F16L 23/22; G01M 3/2853
See application file for complete search history.

(56) References Cited

U.S. PATENT DOCUMENTS

| | | | | |
|---|---|---|---|---|
| 3,141,685 A | * | 7/1964 | Watts | F16L 17/063 277/320 |
| 4,019,371 A | | 4/1977 | Chaplin et al. | |
| 7,559,244 B2 | * | 7/2009 | Hoimyr | F16L 23/16 73/706 |

FOREIGN PATENT DOCUMENTS

| | | |
|---|---|---|
| GB | 952755 | 3/1964 |
| JP | H07233887 | 9/1995 |
| WO | 9715814 | 5/1997 |

(Continued)

OTHER PUBLICATIONS

International Search Report, PCT/NO2014/050231, date of mailing Mar. 11, 2015.

(Continued)

*Primary Examiner* — Gilbert Lee
(74) *Attorney, Agent, or Firm* — Andrus Intellectual Property Law, LLP

(57) ABSTRACT

A gasket is for an annular compact flange. The compact flange includes two joinable flange halves which are formed with contact surfaces facing each other, and at least one of the flange halves having an axial, centric bore. An annular gasket groove is arranged in each of the flange halves, which is arranged to sealingly receive a common gasket. The gasket groove has a proximal side and a distal side relative to the bore, the distal side, which is conical, forming a groove sealing surface against the gasket. The gasket, which seals at the groove sealing surface, is formed with a plate portion positioned between the contact surfaces.

8 Claims, 2 Drawing Sheets

(56) References Cited

FOREIGN PATENT DOCUMENTS

WO        03027561        4/2003

OTHER PUBLICATIONS

Norwegian Search Report, Patent Application No. 20131699, date of mailing Jun. 26, 2014.
Written Opinion, PCT/NO2014/050231, date of mailing Mar. 11, 2015.

\* cited by examiner

COMPACT PIPE FLANGE GASKET

CROSS-REFERENCE TO RELATED APPLICATIONS

This application is the U.S. national stage application of International Application PCT/NO2014/050231, filed Dec. 11, 2014, which international application was published on Jun. 25, 2015, as International Publication WO 2015/093968 in the English language. The international application is incorporated herein by reference, in entirety. The international application claims priority to Norwegian Patent Application No. 20131699, filed Dec. 18, 2013, which is incorporated herein by reference, in entirety.

FIELD

This invention relates to a gasket for a compact flange. More particularly, it relates to a gasket for an annular compact flange, the compact flange including two joinable flange halves which are formed with contact surfaces facing each other, and at least one of the flange halves having an axial, centric bore, and there being an annular gasket groove arranged in each of the flange halves, which is arranged to sealingly receive a common gasket, the gasket groove having an proximal side and a distal side relative to the bore, the distal side, which is conical, forming a groove sealing surface against the gasket.

BACKGROUND

Because of lower weight and cost, among other things, so-called compact flanges are often preferred to conventional pipe flanges. An example of a compact pipe flange consists of the so-called "SPO Compact Flange" from Vector International Ltd, South Glamorgan, Great Britain.

In contrast to conventional pipe flanges, in which there is equipment for individual pressure testing of the gaskets in each flange, it is not possible to carry out such pressure testing of the gaskets in a compact flange.

Pressure testing of the gaskets must therefore be carried out by pressurizing the whole plant or parts of the plant in which the compact flanges are included, before the plant is put into service. Such pressure testing may include repeated flushing of the pipe because the pressure-testing medium must not be mixed with the medium that the system is going to handle.

From JP H07233887 A, a flange connection is known, consisting of two flange halves with centric bores and with annular gasket grooves in each flange half for receiving a gasket, the groove having an proximal side and a conical distal side. The associated gasket is formed to fit the grooves of the flanges and is further made with a plate-shaped portion extending inwards towards the bore of the flanges.

GB 952755 A discloses a flange connection with a groove with an outer conical surface and a gasket adapted thereto. In addition to a ring with an outer conical surface, the gasket also has plate portions extending both inside and outside of said ring. The inner seal may be formed of a second conical ring, for example. The gasket is further provided with a channel for use in leakage testing.

From U.S. Pat. No. 4,019,371 A, a device and method for testing flange gaskets consisting of a separate annular gasket and a plate-shaped gasket with a channel for leakage testing are known. The area that is pressurized for leakage testing is an annular volume outside the conical ring gasket.

WO03027561 A1 shows a gasket arrangement for flanges with the possibility of leakage testing between inner and outer gasket parts, but here the gasket is disc-shaped in its entirety.

WO9715814 A1 shows an arrangement for leakage testing flange gaskets, wherein the bore for supplying pressure is in one of the flange halves.

SUMMARY

The invention has for its object to remedy or reduce at least one of the drawbacks of the prior art.

The object is achieved according to the invention through the features that are specified in the description below and in the claims that follow.

A gasket for an annular compact flange is provided, the compact flange including two joinable flange halves which are formed with contact surfaces facing each other, at least one of the flange halves having an axial, centric bore, and there being an annular gasket groove arranged in each of the flange halves, which is arranged to sealingly receive a common gasket, the gasket groove having a proximal side and a distal side relative to the bore, the distal side, which is conical, forming a groove sealing surface against the gasket, and the gasket being characterized by the gasket forming a groove seal that seals at the groove sealing surfaces;

the gasket being formed with a plate portion positioned between the contact surfaces;

a part of the plate portion positioned between the bore and the gasket groove forming an inner seal together with the contact surfaces, the inner seal being at a distance from the groove seal; and a channel, which leads into the gasket groove at the inner seal, extending to the outside of the plate portion.

At the same time as the gasket is tightened against the groove sealing surfaces when the flange halves are being pulled together, the plate portion will absorb any unevenness in the contact surfaces of the flange halves. The compact flange is thereby less sensitive to inaccurate relative aligning of the flange halves, for example.

According to the established practice, the gasket is formed in such a way that, in a fitted position, it has clearances to both the proximal side of the gasket groove and the bottom of the gasket groove.

The channel preferably extends through the plate portion.

The channel is typically designed for leakage testing by the connection of a leakage testing apparatus.

After the compact flange has been assembled, there are, in each flange half, one annular groove seal formed at the groove sealing surface, and one annular inner seal.

By pressurizing the area between these seals via the channel, the seals may be checked for leakage. After pressure testing, the leakage testing apparatus is disconnected, and the channel is closed, for example by means of a plug.

An outer seal may be formed between the contact surface and the plate portion at the outer diameter of the flange halves. The outer seal prevents water, for example, from outside from entering between the flange halves.

The plate portion, which typically covers most of the contact surfaces, is provided with bores for flange bolts.

The gasket is typically formed from a softer material than the flange halves. The purpose is to make any damage arising between the gasket and the flange halves be absorbed by the gasket. The gasket thus moulds to the flange halves, which may also help to make the gasket repeatedly usable.

The device according to the invention enables individual pressure testing of the gasket in each compact flange without having to pressurize the bore of the compact flange, which substantially facilitates the commissioning of plants with this type of flange.

BRIEF DESCRIPTION OF THE DRAWINGS

In what follows, an example of a preferred embodiment is described, which is visualized in the accompanying drawings in which.

DETAILED DESCRIPTION OF THE DRAWINGS

Figure 1:
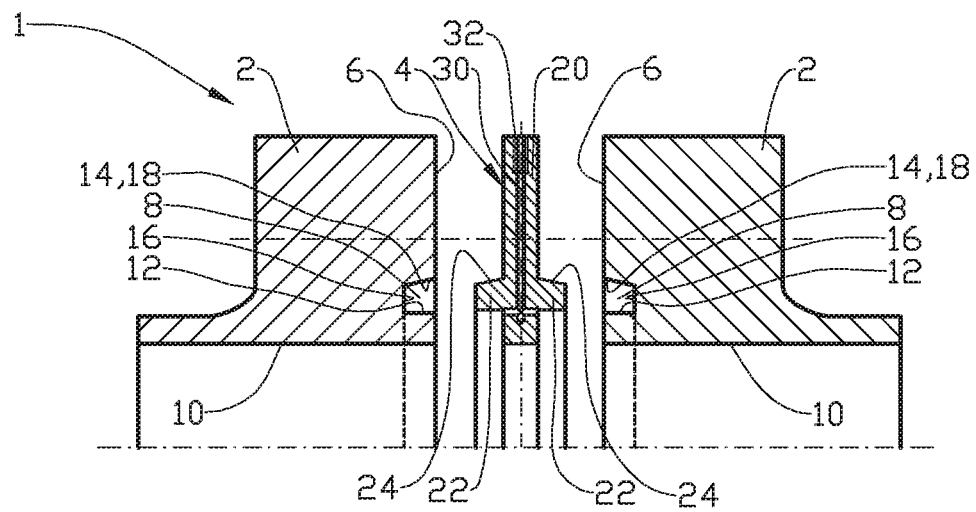
FIG. 1 shows, in an axial section, various components of a compact flange with a gasket according to the invention.

In the drawings, the reference numeral 1 indicates a compact flange that includes two normally identical flange halves 2 and a gasket 4. The flange halves 2 are formed, in a manner known per se, with contact surfaces 6 in the position of application and annular gasket grooves 8, which are arranged to receive the gasket 4, facing each other.

Each of the flange halves 2 has a pipe passage in the form of a centric bore 10.

The gasket groove 8 has a proximal side 12 and a distal side 14 relative to the bore 10. The gasket groove 8 further has a bottom portion 16. According to the art known per se, the distal side 14 is inclined relative to the longitudinal direction of the flange 1, thereby forming a conical groove sealing surface 18.

The gasket 4 includes an annular plate portion 20 that fits between the flange halves 2. On both its sides, the plate portion 20 is formed with annular bulbs 22 fitting the gasket grooves 8 of the respective flange halves 2.

Figure 2:
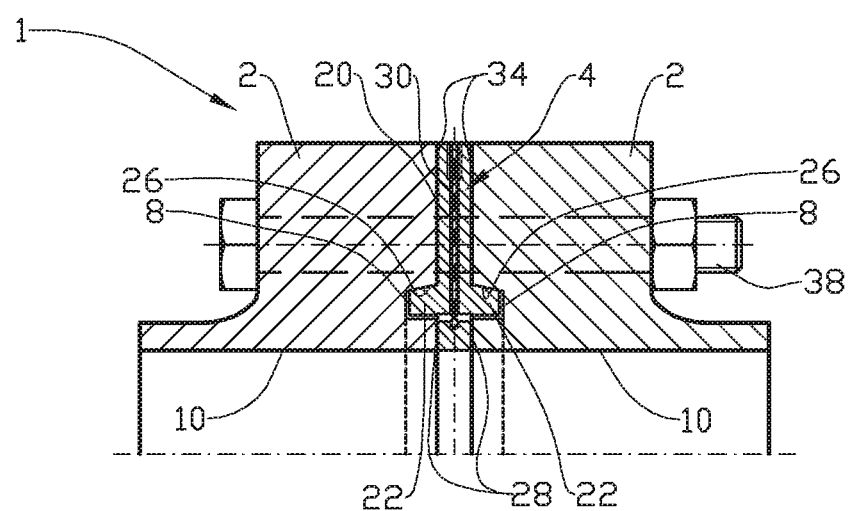
FIG. 2 shows the compact flange of FIG. 1 in an assembled state.

A conical side 24 of each of the bulbs 22 fits complementarily and forms a groove seal 26 against the groove sealing surface 18 when the flange halves 2 have been pulled together, see FIG. 2.

When the flange halves 2 have been pulled together against the plate portion 20, an annular inner seal 28 is formed in the area between the gasket groove 8 and the bore 10. The inner seal 28 is at a distance from the groove seal 26. By the very fact of there being a distance between the gasket 4 and the proximal side 12 and a distance to the bottom portion 16, pressure testing of these seals can be carried out by pressurizing the area between the seals 26, 28.

Figures 4, 5:
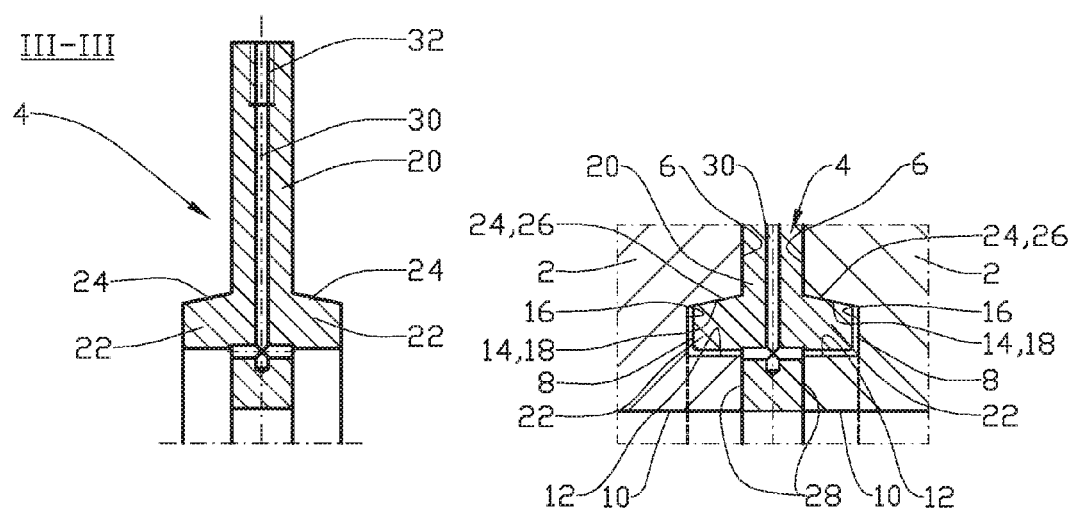
FIG. 4 shows a section III-III of FIG. 3 on a larger scale.
FIG. 5 shows a section of FIG. 2 on a larger scale, in which pressure testing of seals may be carried out.

A channel 30, see FIG. 4, extends through the plate portion 20 from the outside of the plate portion 20 and has its mouth at the gasket groove 8 near the inner seal 28. The channel 30 is provided with a threaded portion 32 for connecting to a necessary leakage testing apparatus, not shown, and for plugging the channel 30.

At its outer portion, the plate portion 20 together with the contact surface 6 forms an outer seal 34, which prevents water, for example, from entering between the flange halves 2.

Figure 3:
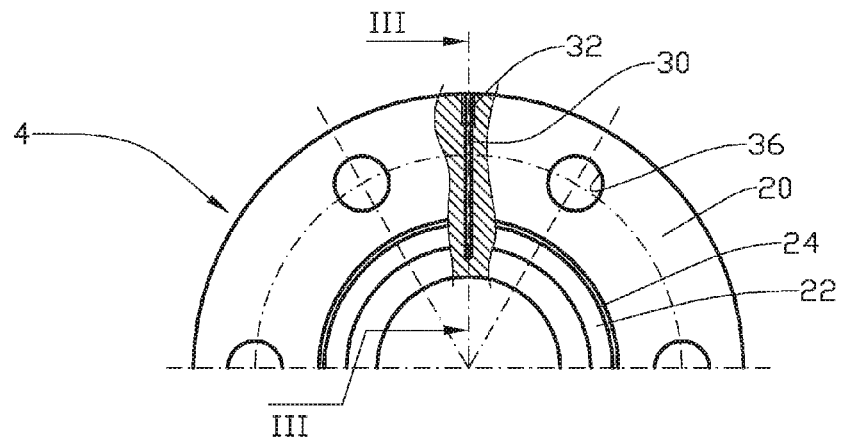
FIG. 3 shows a side view of a gasket partially in section.

The gasket 4 has through-going openings 36 for flange bolts 38, see FIGS. 2 and 3.

The invention claimed is:

1. A gasket for an annular compact flange, the compact flange including two joinable flange halves which are formed with contact surfaces facing each other, and at least one of the flange halves having an axial, centric bore, and there being an annular gasket groove arranged in each of the flange halves, which is arranged to sealingly receive a common gasket, the gasket groove having a proximal side and a distal side relative to the bore, the distal side, which is conical, forming a groove sealing surface against the gasket, wherein
   the gasket forms a groove seal sealing at the groove sealing surfaces;
   the gasket is formed with a plate portion positioned between the contact surfaces;
   a part of the plate portion positioned between the bore and the gasket groove forms an inner seal together with the contact surfaces, the inner seal being at a distance from the groove seal; and
   a channel, which leads into the gasket groove at the inner seal, extends to the outside of the plate portion, the channel being provided with a threaded portion arranged for connecting to a leakage testing apparatus and for plugging the channel.

2. The gasket according to claim 1, wherein the channel extends through the plate portion.

3. The gasket according to claim 1, wherein an outer seal is formed between the contact surface and the plate portion at the outer diameter of the flange halves.

4. The gasket according to claim 1, wherein the plate portion is provided with openings for flange bolts.

5. The gasket according to claim 1, wherein the gasket is formed from a softer material than the flange halves.

6. The gasket according to claim 1, wherein the channel is in communication with an area located between the groove seal and the inner seal, and adapted to be pressurized from outside the channel to facilitate pressure testing of the groove seal and the inner seal.

7. The gasket according to claim 6, wherein the plate portion includes annular bulbs extending into the gasket groove.

8. The gasket according to claim 7, wherein the area includes a distance between the annular bulbs and the proximal side of the gasket groove, and a distance between the annular bulbs and a bottom side of the gasket groove lying between the proximal side and the distal side of the gasket groove.

* * * * *